United States Patent Office 3,354,031
Patented Nov. 21, 1967

3,354,031
CEMENT-ASBESTOS PRODUCTS AND IM-
PROVEMENT IN THE MANUFACTURE
THEREOF
John J. Kozacik, Cincinnati, Ohio, assignor to Philip Carey
Manufacturing Company, Cincinnati, Ohio, a corporation of Ohio
No Drawing. Filed July 16, 1964, Ser. No. 383,235
17 Claims. (Cl. 162—145)

ABSTRACT OF THE DISCLOSURE

A cured cement-asbestos sheet product having a substantial proportion of soft chrysotile asbestos fibers, and including a small percentage of harsh mineral glass fibers of specified small diameter. A method of improving the filtration rate of a waterlaid web formed from a water slurry of Portland cement and asbestos fibers, by addition to the slurry, just prior to the web formation, of a small percentage of harsh mineral glass fibers. From about 1% to 5% by weight of the compositon of harsh, small-diameter mineral glass fibers are included in the fibrous mineral content of a waterlaid cement-asbestos product, a substantial proportion of the asbestos fibers being of the soft chrysotile variety.

This invention relates generally to cement-asbestos products, and to an improvement in the manufacture of sheet products containing hydrated (cured) Portland cement as a cementing and bonding material, and asbestos fiber as a structural reinforcing material. These two materials are integrated by the manufacturing process into a monolithic, dense, strong, rigid, hard, durable structure as the final product. In the manufacturing industry and in the commerical fields of application of these products they are commonly referred to as "asbestos-cement" even though the Portland cement usually is the major proportion and the asbestos fiber the minor proportion by weight, of these two materials in the composition. In the interest of technical accuracy, and to distinguish the product of this invention from the commonly known asbestos-cement insulating materials, the product here involved will hereinafter be designated as a cement-asbestos product. The properties of cured Portland cement are predominant, but modified and improved by the incorporation of the asbestos fiber within the mass, and the product could not be made without the asbestos reinforcement.

The cement-asbestos products with which this invention is chiefly concerned include roof shingles, sidewall shingles, clapboards and panels; corrugated roofing and siding sheets; flat sheets in dimensions up to 48" x 144"; sandwich panels with various insulation core materials; pipe and tubing; and various special forms and shapes of the material. Sheet products made from compositions in which the asbestos fiber is the major proportion and the Portland cement the minor proportion, by weight, are usually termed "asbestos millboard" or simply "asbestos board." This latter group of products, because it contains less Portland cement and more fiber, is less dense, hard, rigid, strong and weather resistant than the first group, but usually has higher thermal insulation capability resulting from its more fibrous and less dense structure.

Commercial cement-asbestos products may contain in their composition varous other materials in addition to the Portland cement and asbestos, including aggregate materials or fillers such as fine sand or limestone flour, precipitated calcium carbonate; lime-reactive curing materials such as silica flour; color pigments or colored granules; and small amounts of refiberized cured cement-asbestos scrap. Some of these products also may carry a surface treatment, such as water-repellent silicone, resin, or soap, or a surface coating, including such materials as organic paint, pigmented resin or baked plastic enamel; and inorganic, heat-cured siliceous pigmented weather-resistant glaze-like compositions.

There are several different methods for producing cement-asbestos sheets, but by far the greatest quantities of such products are made by first forming a water-laid web of a mixture of asbestos fiber and partially hydrated Portland cement from a thin slurry or suspension of these two materials in water. The process of forming the web involves filtering off most of the water so that the solids (fiber and cement) are deposited or "water laid" to form a continuous solid wet sheet on a foraminous surface such as a moving screen, screen-covered perforated cylinder, or water-absorbent felt under a partial vacuum. The web thus formed is further consolidated and de-watered by vacuum applied to suction rolls or felts, or by pressure rolls as the web travels through the machine. It will be apparent that this process closely resembles that of paper making, so that in effect the process consists of forming continuously a web of asbestos fibers, and this web then serves to filter out and carry through the machine the heavy load of Portland cement which is admixed with the fibers in the water slurry.

Various modifications of the above described process and different forms of machines to carry it out have been developed and extensively used for many years and are so well known in the industry that they need not be described in detail. This invention is applicable to any such process or machine involving the principles of filtration and vacuum or pressure dewatering of a cement-asbestos web formed from a slurry, and is effective to increase the productivity of the machine and enhance the uniformity and quality of the cement-asbestos sheet formed. The increased productivity reduces the manufacturing cost, while at the same time the structure of the sheet formation is made more uniform, whereby the quality of edge trim is improved, and the control of caliper of the finished product is also improved.

An important limiting factor in the production of cement-asbestos sheets by any wet machine filtration method is that the thickness of the web that can be water-laid from an asbestos fiber or cement-asbestos fiber slurry is small (of the order of .010" to .018"). Therefore, to obtain the desired final thickness of the sheet product it is usually necessary to laminate together and integrate multiple layers of the waterlaid web. This is generally accomplished by forming the cement-asbestos web on a machine having multiple forming cylinders, usually at least three or four. The web formed on the first cylinder is transferred to an absorbent carrier felt and successive additonal web layers are added by each of the other cylinders, with dewatering by suction applied to the web through the carrier felt after each addition. After the multiple layer web has been formed and partially dewatered as above described, the specified thickness of the desired final product is obtained by transferring the web to a wrapping cylinder, generally termed an accumulator roll. The web is then wound or "wrapped" on this roll to the required number of convolutions to give the thickness desired. The laminated wet sheet is then slit laterally, removed from the roll, and transferred to further processing operations such as drying, pressing, embossing, trimming, curing (atmospheric or steam autoclave), coating, heat treatment, etc.

For example, a cement-asbestos siding shingle having a caliper of 0.160" may consist of ten integrated layers of the wet web originally formed on each of the cylinders, with an average thickness of 0.016". To produce a cement-asbestos board of 3/16 inch (0.187″) thickness on a four forming cylinder machine may require four wraps on the accumulator roll, and the board would thus consist of 16 wet web layers, each about 0.012″ in thickness. Sheets of final thickness of 3/8 inch, 1/2 inch or even up to 3/4 inch may be made, and will have correspondingly greater numbers of integrated layers.

It is evident that the efficient and rapid production of cement-asbestos sheet material on a wet machine is basically a filtration problem, and that what is required is rapid and uniform filtration of the water from the wet laid web on the machine cylinder, without excessive retention of water within the cement-asbestos web after it has been formed and dewatered. This invention teaches a simple, practical and effective method of accomplishing this desired result. The method of the invention results in a very substantial increase in the speed of production on the wet machine, with improved uniformity of the sheet products so that better overall quality is obtained. Also, the invention makes possible the use, in cement-asbestos products, of certain kinds of asbestos fibers which previously have been considered unsuitable because of their inferior "drainage" behavior on the wet machine cylinder.

These improved results of the invention are accomplished by including, in the cement-asbestos-water slurry from which the wet laid cement-asbestos web is formed, a very small amount of a "non-asbestos" mineral fiber, such as mineral glass fiber of the kind known commercially as rock wool, mineral wool, or slag wool. The amount of such synthetic mineral fiber required will preferably be in the range of only about 1% to about 3%, by weight, of the dry solids in the cement-asbestos composition. The mineral glass fiber is used, not to replace any of the asbestos fiber, but in effect to modify the properties of the asbestos, particularly its filtration or "drainage" characteristics.

It is known that it is difficult to withdraw the water from a wet layer of Portland cement, even by applying vacuum or mechanical pressure. Among the reasons for this behavior are the fact that Portland cement is very finely divided (this is necessary to ensure rapid chemical hydration and hardening of the cement, and has a very high specific surface area. The water is absorbed on the surfaces of the cement particles and within the capillary interstices of the mass. Also, because the cement begins to undergo hydration as soon as it is brought into contact with water, there is continuous formation of hydrated calcium silicate of a gelatinous nature within the capillary spaces, and this gel retards the flow of water through or from the mass. Further, the hydration of the cement particles involves a chemical depletion of the available water as it is gradually consumed in the formation of hydrated calcium silicate. Sufficient water must remain, in any event, to enable proper curing of the final cement product; but usually a considerable excess of water remains.

As a cement-asbestos sheet can only be produced with a carrier web of asbestos fibers, the filtration behavior of the asbestos fiber web is therefore very important in determining the uniformity of the structure of the wet laid web, the drainage rate of water from the web, and the retention of water in the partially dewatered sheet.

Technologists in the asbestos-consuming industries, and particularly those concerned with producing asbestos paper and cement-asbestos products by wet machine methods, have long been aware of great differences in the physical characteristics of asbestos fibers from different sources. These differences exist not only for fibers of differing chemical composition, as for example, chrysotile, amphibole, crocidolite and Amosite, but also among fibers from different deposits of the same chemical type and closely similar composition. Thus it appears to be true that no two deposits of chrysotile asbestos (a hydrated magnesium silicate of the general chemical formula: $3MgO.2SiO_2.2H_2O$) are truly identical in physical character. These differences are generally ascribed to the effects of small amounts of other minerals present as impurities associated with the asbestos fibers, or to (unknown) differences in the geologic conditions existing during the time when the fibers were being formed within the crevices of the matrix rock in each of the deposits.

Most of the asbestos fiber produced in the United States and Canada is of the chrysotile variety and due to its ready availability and generally excellent and controlled quality it is very extensively used in the manufacture of cement-asbestos products in this country, as well as in many other countries. The generally accepted standards for asbestos fiber consumed in the U.S.A. are those established in Canada by the Quebec Asbestos Manufacturers' Association, published as their Standard Fiber Classification System, and checked by a Canadian Government bureau. In this system the fiber is classified by its behavior in a standard screen test which determines the proportions of fibers of various lengths in the test sample, as collected on 1/2 inch mesh, 1/4 inch mesh and 10 mesh sieves. Each grade is defined by the amount retained on each sieve and passing the 10 mesh sieve; and minimum limits are established which commercial shipments of each grade of asbestos fiber must meet. This test is useful and necessary for quality control, as it measures the average length and distribution of fiber length in the asbestos grade; but it does not define any of the other important qualities of the fiber. The asbestos fiber grades chiefly used in cement-asbestos production are those in Classes 4, 5 and 6 of the Q.A.M.A. Fiber Classification System and these are commonly referred to as "paper making" grades of fiber.

One of the most notable differences in physical character found among chrysotile asbestos fibers from different deposits is in the quality of harshness, sometimes termed "crudiness." A harsh fiber is stiffer and less flexible, for a given diameter, than a similar fiber that is less harsh. There are many degrees of variation in this quality among commercial asbestos fibers from different chrysotile deposits. In general, a waterlaid web of harsh chrysotile fiber will exhibit more rapid drainage, i.e. more effective filtration of water from and through the web, with or without and admixture of Portland cement, than will a similar web made with a softer or less harsh asbestos. This has prevented or severely limited the use of certain "soft" types of chrysotile fiber in cement-asbestos production.

Chrysotile asbestos fiber from certain deposits in Quebec, Canada, such as those near East Broughton, is characterized by extreme "softness." The reasons for this quality are not known, as the fiber does not show any substantial differences in composition or chemical impurities as compared with chrysotile from other nearby Canadian asbestos deposits, and is a true chrysotile. The fiber from these deposits meets the Q.A.M.A. standards, and has strength, flexibility, heat resistance, durability and other qualities essential to its use in cement-asbestos products. But associated with its "softness" is its tendency to form waterlaid webs that filter slowly and sometimes unevenly in cement-asbestos wet machine production. Apparently the soft asbestos fibers have a greater tendency to form compacted clots or clumps of fibers through which the water filters less rapidly.

Various expedients have been resorted to in an effort to adapt soft chrysotile asbestos to effective use in cement-asbestos products. It has sometimes been admixed with a harsh chrysotile fiber from a different deposit, or with a harsh asbestos fiber from another source such as crocidolite or Amosite. In some cases longer (and more expensive) grades of chrysotile or other asbestos have been admixed with the soft type, as in general longer grades filter more readily than the shorter, finer fiber grades. Another expedient has been to fiberize or open the soft chrysotile fiber less completely, thus to leave part of the fiber as relatively coarse bundles which are stiffer and more harsh than completely opened fiber. This latter method is unsatisfactory, as the resulting fiber structure of the wet laid web is not uniform, and this detracts from the full effectiveness of the fiber reinforcement of the cement-asbestos sheet.

Efforts also have been made to solve the filtration problem by including a relatively coarse aggregate material, such as sand, in the cement-asbestos furnish. This expedient gives unsatisfactory results, as the aggregate tends to settle out of the slurry in the wet machine chests, vats and pipes, so that much of it is lost. Also, the retention of such aggregate particles in the wet laid sheet tends to reduce the flexural strength of the finished product and make it more brittle and subject to cracking under stress or impact forces.

As a means of measuring the effectiveness of this invention by a laboratory test simulating the conditions of wet machine formation of a cement-asbestos sheet, a modification of the "Standard Method for Evaluation of Portland Cement for Use in Asbestos-Cement Products" has been adopted. This method was developed some years ago by the Asbestos-Cement Products Association (a group of manufacturers of cement-asbestos products) for the guidance of Portland cement manufacturers, to enable them to produce cement of suitable quality for use in wet machine production of cement-asbestos products. The method is adaptable, with suitable modifications in procedure, for the evaluation of asbestos fiber and other raw materials to be used in cement-asbestos products. The test is commonly referred to as the "Sag Test," but for present purposes the data it provides on filtration behavior are of most direct interest.

Briefly, this test method involves the following steps: (1) Mixing a weighed quantity of the dry ingredients of the composition to be tested—Portland cement, asbestos fiber, silica flour, etc., (2) Mixing a weighed quantity of the dry mix composition with a measured quantity of water at a specified temperature for a specified time, (3) Filtering the slurry on a suction filter under a specified vacuum condition for a specified time to form a filter cake, (4) Removing the "wet laid" filter cake, (5) Weighing the filter cake, (6) Pressing the filter cake under specified conditions of pressure and time and removing the pressed filter cake from the mold, (7) Reweighing the pressed filter cake. During the carrying out of the above test procedure, data are obtained on the "filtering time" for the cement-asbestos composition, the percent water retention of the filter cake after filtering, and its percent water retention after pressing.

Further tests to evaluate the effects of changes in the cement-asbestos composition on the properties of the final product may then be made by curing the pressed filter cake, either by normal moist atmospheric curing or by steam pressure autoclave curing, whichever is appropriate to the composition being tested. The cured and hardened filter cake may then be subjected to the usual quality tests for cement-asbestos products, such as flexural strength (Modulus of Rupture), water absorption, density, deflection under load, etc.

It has been found that the results of this test in terms of filtration behavior and the properties of the experimental cement-asbestos products made in accordance with the invention correlate very well with the drainage rates, wet machine productivities and finished product properties of similarly formulated cement-asbestos products in actual production. In other words, the test generally predicts wet machine performance of these improved cement-asbestos compositions.

Referring to the kinds of mineral glass fibers that are effective to give the improved results of the invention, these may vary rather widely in composition but fall generally in the class of materials known commercially as rock wool, mineral wool or slag wool fibers. Suitable fibers of this type are well known and are produced commercially on a large scale, and the products are used extensively for thermal insulation of buildings and industrial equipment. The method of production is to subject a stream of the molten fluid mass of the glassy composition to the action of a jet of steam or air, or of a rapidly revolving metallic wheel or spinning disc, which attenuates or "draws" the fluid material into a fine glassy fiber, which then solidifies on cooling. These mineral glass fibers, although rather fine in diameter, are of somewhat harsh and stiff character, not suitable for spinning to produce glass threads or fabrics, and are easily broken by stresses such as bending, crushing or abrasion. This fragility of the fibers does not prevent them from being effective according to this invention, when incorporated in the cement-asbestos slurry in the proper manner.

Suitable mineral glass fibers may be produced from various readily available raw materials, including certain natural siliceous, calcareous and argillaceous rocks, iron blast furnace slag, phosphorus furnace slag, and some other slags of siliceous character. A typical range of composition follows:

| | Composition, percent by weight |
|---|---|
| Major ingredients: | |
| Silica ($SiO_2$) | 36–50 |
| Alumina ($Al_2O_3$) | 8–16 |
| Calcium oxide ($CaO$) | 28–45 |
| Minor ingredients: | |
| Magnesium oxide ($MgO$) | 2–12 |
| Manganese oxide ($MnO_2$) | 0.75–1.25 |
| Iron oxide ($Fe_2O_3$) | 0.2–1.5 |
| Sulphur ($S$) | Trace–0.5 |

The fiber may be defined as primarily a calcium aluminum silicate glass, modified slightly in properties by the small amounts of magnesium, manganese and iron oxides present. While somewhat larger amounts of these oxides could be tolerated, experience has indicated that the iron oxide content should not exceed about 10%, due to its effect in rendering the mineral glass fiber finer in diameter and softer and less harsh when iron oxide is present in larger amounts. Thus the inclusion of lead slag and other high-iron oxide-containing slags in the mineral glass composition should be limited so that the 10% figure is not exceeded. Small amounts of sodium oxide also may be included in the mineral glass composition, although usually very little of this oxide is present in the raw materials used. Silica also may be added to balance the composition if insufficient of this oxide is present in the other available raw materials to render the glass chemically stable and resistant to the action of moisture.

Tests have shown that the physical characteristics of the mineral glass fiber are more important than its chemical composition in determining its suitablity for use in the improved method of cement-asbestos production. It has been found that the most effective results are obtained when the fiber diameter lies in the range of 7 to 20 microns (thousandths of a millimeter). Thus, mineral glass fibers produced from a high-iron oxide-containing slag, and having a fiber diameter less than about 5 microns, were found not effective to improve the filtration rate of a slow draining cement-asbestos slurry in which they were included. Fibers in the range from about 5 to about 25 microns in diameter are effective and may be used but are less satisfactory than the preferred 7–20 micron range because they tend to make the cement-asbestos web less smooth and uniform in structure. It will be understood that commercially available mineral glass fibers will inevitably include a proportion of fibers of a diameter less than 5 microns and some which have a diameter greater than 25 microns. The desired results will nevertheless be achieved so long as the bulk of the fibers have a diameter in the range stated.

While a range of mineral glass compositions which are suitable and effective in the practice of the invention has been indicated, it is not intended to exclude other mineral glass fibers, such as fused aluminum silicate, or coarse, harsh sodium glass fibers, provided such fibers have the essential physical properties, range of fiber diameter, harshness, resistance to solution or disintegration in contact with water, and chemical stability.

Due to the methods used in their production, the mineral glass fibers such as have been found effective for the method of the invention, sometimes contain a proportion of glassy material that is not fibrous. This non-fibrous material is usually in the form of small generally spherical particles which are commonly referred to as "shot." These shot particles associated with the mineral glass fibers are undesirable in this process as they do not contribute to the formation of the fibrous cement-asbestos web. Mineral glass fiber which contains not more than about 15% by weight of "shot," defined as any non-fibrous glassy material retained on a No. 50 mesh standard testing sieve, is preferred.

If the mineral glass fiber available has an excessively high proportion of shotty material, this can be corrected by the well known industry practice of subjecting the fiber to a shredding and "graulating" process, followed by screening to remove the shot. Such processed "granulated" mineral glass fiber is entirely suitable for use with the invention provided the fibers are of the requisite harshnes, diameter, water resistance and chemical stability.

In the cement-asbestos products to which this invention is particularly applicable the asbestos fiber content usually is in the range of 12% to 45%, by dry weight, of the virgin materials used in the slurry composition from which the wet laid sheet is formed. The remainder, 55% to 88% by dry weight, consists of Portland cement, lime-reactive silica, fillers, pigments, etc. When small amounts of pulverized cured cement-asbestos scrap are added to the composition, this is not included in the above stated percentage ranges. The cured scrap material has substantially the same cement-fiber composition as the product being made from the virgin materials and is to be regarded merely as a fibrous aggregate with little or no effect on the composition or properties of the finished product.

When the cement-asbestos composition contains lime-reactive silica flour, in those products which are to be autoclave cured, the sum of the Portland cement and the fine silica is considered to be "cement," within the percentage limits above stated. This is for the reason that in the autoclave curing process under elevated steam pressure and temperature the fine silica reacts with the free lime liberated by the Portland cement during the hydration reaction. The end product of this lime-silica reaction is a calcium silicate hydrate which is substantially identical in composition and properties with that produced by the normal hydration of Portland cement. Thus, both the raw Portland cement and the fine silica react with water, under steam pressure to produce the same end result—namely, hardened cement. The cement/silica ratio for complete reaction is about 2.5/1.0 parts by weight, although sometimes a slight excess of the fine silica is used.

One convenient method for incorporating the mineral glass fiber in the cement-asbestos composition is to prepare a dry premix of the asbestos fiber and the mineral glass fiber in the desired proportions. This is easily done by tumbling the fibers together in a revolving drum blender. Other methods of dry mixing may be used so long as they avoid subjecting the mineral glass fibers to mechanical stresses or abrasive action that would cause damage to the fiber structure. The proportion of mineral glass fiber incorporated in the asbestos is adjusted so as to provide the desired percentage content, in the range of about 1 percent to about 3 percent by weight, in the cement-asbestos composition of which the fiber mixture is to be used as the fibrous web component. Since the asbestos fiber content of the cement-asbestos products of this invention usually ranges from 12% to 45%, it can readily be calculated that the proportion of mineral glass fiber, expressed as a percent of the asbestos fiber content, will range from about 2% (where the asbestos fiber constitutes about 45% of the total dry solids) to about 25% (where the asbestos fiber constitutes about 12% of the total dry solids).

To make sure that the effectiveness of the mineral glass fibers in improving the filtration of the cement-asbestos web is not reduced or destroyed by excessive mechanical agitation or abrasive action during the mixing of the slurry, it is advantageous to delay the addition of the mineral glass fibers until the mixing operation is nearly complete, as, for example, adding them continuously to, or just before, the head box. Thus, the mineral glass fibers are subjected only to sufficient mixing to ensure their uniform and thorough dispersion in the slurry before it is supplied to the wet machine forming cylinder.

To illustrate the effectiveness of the invention to increase the rate of formation and dewatering of a cement-asbestos web in machine production of such products, while maintaining or improving their quality and uniformity, and also including substantial proportions of soft slow-draining chrysotile asbestos fiber in the composition, the following specific examples taken from practical application to the manufacturing process are presented.

EXAMPLE I

A commercial grade of ¼ inch thick cement-asbestos board was made on the machine in regulator production from a water slurry having the following composition of dispersed virgin solid materials (and also including a small proportion of refiberized hardened scrap), designated Formula A.

Formula A, dry solids, percent by weight
Amosite asbestos (harsh) _____ 2.1
6D chrysotile asbestos (harsh) _____ 10.3
5R chrysotile asbestos (soft) _____ 11.4
Portland cement _____ 76.2

100.0

In the above formula over half (52%) of the asbestos fiber is of the fast-draining harsh type and 48% is of the slow-draining soft chrysotile type.

When the above formula was run on the machine under standard operating conditions, the maximum steady production rate was about 4,570 square feet per hour of ¼ inch thick sheet. Formula A was then modified by adding to the cement-asbestos slurry and dispersing in it about 3 percent, by dry weight of the total solids, of mineral glass fibers of the kind described above. The immediate result was a striking increase in the rate of formation and dewatering of the cement-asbestos web on the wet machine, and the maximum steady production rate increased to about 5,240 square feet per hour of ¼ inch thick board, or a production rate increase of about 12 percent. In other machine runs of similar cement-asbestos boards substantial production increases were also obtained, in one case as great as 46 percent, from the addition of only 3 percent of mineral glass fiber to the slurry formula.

Samples of the production from Formula A and from the modified Fomula A (containing about 3% mineral glass fiber) were cured and hardened in the normal manner and then tested, with the following results:

| | Formula A | Formula A Plus 3% Mineral Glass Fiber |
|---|---|---|
| Flexural Strength (MR), Dry, lb. per sq. in. | 3,635 | 4,010 |
| Density, lb. per cubic in. | .0573 | .0566 |
| Water absorption, percent | 22.1 | 23.4 |

In both cases the properties are normal for this type of cement-asbestos board and meet the requirements of the applicable A.S.T.M. and Federal Specifications for strength, density and water absorption. Rather than detracting from the properties of the finished product the addition of the mineral glass fiber actually resulted in an increase (about 10%) in flexural strength of the board.

EXAMPLE II

A production run of 4.2 inch pitch cement-asbestos corrugated panels (sheets 3/16 inch thick, 42 inches wide, 12 feet long) was made on the wet machine from the following composition of virgin materials (also containing a small proportion of refiberized hardened scrap), designated Formula B.

|  | Formula B, dry solids, percent by weight |
|---|---|
| Amosite asbestos (harsh) | 2.0 |
| 4D chrysotile asbestos (harsh) | 4.6 |
| 6D chrysotile asbestos (harsh) | 3.4 |
| 5R chrysotile asbestos (soft) | 10.4 |
| 6D chrysotile asbestos (soft) | 3.4 |
| Portland cement | 76.2 |
|  | 100.0 |

In the above formula over half (58%) of the asbestos fiber was the soft, slow-draining type chrysotile, and 42% was harsh chrysotile and Amosite.

The maximum steady production rate on the wet machine with Formula B was about 3,875 square feet per hour of 3/16 inch thick sheet. When Formula B was modified by the addition to the slurry of about 3 percent, by dry weight of the total solids, of mineral glass fibers of the kind above disclosed, the steady production rate rose to about 4,450 square feet per hour, an increase of about 11.5%.

Samples of the sheets produced from Formula B and from the modified Formula B (containing 3% mineral glass fiber) were cured and hardened in the normal manner and then tested, with the following results.

and water absorption. It should be noted that the breaking A.S.T.M. and Federal Specifications for strength, density strength of the finished product from the Formula B modified with 3% of mineral glass fibers was actually about 9 percent greater than that from the regular formula.

This example demonstrates that the method of the invention enables the use of over half of the total asbestos fiber as the soft chrysotile type in this product, while increasing production rate on the machine and also obtaining a significant improvement in strength of the finished product.

EXAMPLE III

The data for this example are presented in Table I (below). The reference formula for the cement-asbestos slurry was Formula B, the same as in Example II, but the product made was of twice the thickness, namely 3/8 inch thick, 4.2 inch pitch corrugated sheets, each of which takes almost twice as long to produce on the wet machine as for the 3/16 inch thickness.

The results show that when Formula B was modified to include about 1.5 percent by weight of the mineral glass fibers in the slurry there was a small increase in production rate, with no significant change in the properties of the finished product, which met all the A.S.T.M. and Federal Specification requirements by a good margin.

Formula C, also made and tested, differed from Formula B in that no harsh chrysotile fiber was used and this was replaced by soft chrysotile asbestos, with the inclusion of about 4.5 percent by weight of the mineral glass fibers in the slurry. Of the total asbestos fiber in the formula, 86% was soft chrysotile. Previous attempts to use soft chrysotile in cement-asbestos production in such high proportions have invariably resulted in a great loss of machine productivity, often as much as 50% of the production rate with harsh chrysotile, and in some cases the product actually could not be made at all.

The test results of the production run with Formula C, containing 86% soft chrysotile, show that the product was successfully made; that the production rate increased by 15.1%; and the cured and hardened finished product met the A.S.T.M. and Federal Specification requirements by a good margin.

TABLE I.—3/8 INCH THICK CEMENT-ASBESTOS CORRUGATED SHEETS, 4.2 INCH PITCH

|  | Formula B, Dry Solids Percent by Weight | Formula B, Plus 1.5% Mineral Glass Fibers | Formula C, Dry Solids Percent by Weight |
|---|---|---|---|
| Amosite Asbestos (harsh) | 2.0 | 2.0 | 3.2 |
| 4D Chrysotile Asbestos (harsh) | 4.6 | 4.6 | None |
| 6D Chrysotile Asbestos (harsh) | 3.4 | 3.4 | None |
| 4K Chrysotile Asbestos (soft) | None | None | 6.5 |
| 5R Chrysotile Asbestos (soft) | 10.4 | 10.4 | 13.0 |
| 6D Chrysotile Asbestos (soft) | 3.4 | 3.4 | None |
| Portland Cement | 76.2 | 76.2 | 72.8 |
| Mineral Glass Fibers | None | 1.5 | 4.5 |
|  | 100.0 |  | 100.0 |
| Percent soft Chrysotile of Total Asbestos Fiber Content | 58 | 58 | 86 |
| Wet Machine Productivity, Square Feet per Hour | 2,485 | 2,575 | 2,860 |
| Difference in Productivity, With Mineral Glass Fiber |  | Plus 3.6% | Plus 15.1% |
| Finished Product Tests: |  |  |  |
| Transverse Breaking Strength, Dry (30" span, 12.6" width), lb. | 687 | 676 | 663 |
| Density, lb. per cubic inch | 0.064 | 0.063 | 0.625 |
| Water Absorption, percent by weight | 16.9 | 19.0 | 18.6 |

|  | Formula B | Formula B Plus 3% Mineral Glass Fibers |
|---|---|---|
| Transverse Breaking Strength, Dry (30" span, 12.6" width), lb. | 380 | 415 |
| Density, lb. per cubic inch | .064 | .063 |
| Water Absorption, percent | 17.7 | 18.9 |

In both cases the properties are normal for this type of product and meet the requirements of the applicable

EXAMPLE IV

This example relates to the production of sheets of about 0.175 inch thickness from which cement-asbestos sidewall shingles are cut. The formula will not be given in detail, but included Portland cement and fine silica and the shingles were steam autoclave pressure-cured to complete the cement-silica reaction. The asbestos fiber in the formula consisted of about 53% of soft chrysotile and 47% of harsh chrysotile and Amosite.

A machine run with the regular formula gave a production rate of about 10,000 square feet per hour. When about 3 percent by dry weight of mineral glass fibers were included in the slurry, the production rate increased to about 12,800 square feet per hour, a 28% increase. The sidewall shingles produced from the modified formula were of good quality and met all specification requirements.

Tests have shown that when less than 1 percent by weight of the mineral glass fibers (based on the total dry solids) is included in the cement-asbestos slurry there is no significant effect on the production rate or on the finished product properties. Between about 1% and about 3% by weight of such fibers there is a substantial increase in production rate, the flexural strength of the product is equal to or somewhat greater than without the mineral glass fibers, and the density and water absorption of the product show no significant difference. Above about 3% and up to about 5% by weight of the mineral glass fibers included in the slurry shows further improvement in the production rate, but the water absorption of the finished product tends to increase and there is usually some tendency, although not in every case, for a small reduction of flexural strength to occur. Thus, it is usually preferred to use not more than about 3% of the mineral glass fibers, although for some cement-asbestos products it may be advantageous to use up to about 5%, since the tendency to reduced strength may be offset by other changes in formulation or in processing of the wet machine sheet.

Mineral glass fibers, included in the slurry in an amount greater than about 5% by dry weight of the total solids, results in greater increases in water absorption and greater reduction in flexural strength of the cement-asbestos product, to a seriously disadvantageous degree.

The embodiments of the invention in which an exclusive property or privilege is claimed are defined as follows:

1. As a fibrous mineral reinforcement for a cement-asbestos sheet product waterlaid from a slurry of Portland cement and asbestos fibers, a mineral fiber mixture consisting of a major proportion of asbestos fibers, of which a substantial proportion is of soft chrysotile asbestos fibers, and a minor proportion of harsh mineral glass fibers, said mineral glass fibers being in the range of about 5 microns to about 25 microns in diameter, said mineral glass fibers constituting from about 2% to about 25% by weight of said mineral fiber mixture.

2. A fibrous mineral reinforcement according to claim 1, wherein said mineral glass fibers are predominantly of calcium aluminum silicate composition.

3. A fibrous mineral reinforcement according to claim 1, wherein the diameter of said mineral glass fibers is between about 7 microns and about 20 microns.

4. A cured and hardened cement-asbestos sheet product composed of a waterlaid web of cement and asbestos fibers, a substantial proportion of said fibers being soft chrysotile asbestos fibers, said cement-asbestos web composition including from about 1% to about 5%, by dry weight, of harsh mineral glass fibers, said mineral glass fibers being in the range of from about 5 microns to about 25 microns in diameter.

5. A product according to claim 4, wherein the diameter of said mineral glass fibers ranges between about 7 microns and about 20 microns.

6. A product according to claim 4, wherein said mineral glass fibers are predominantly of calcium aluminum silicate composition.

7. A cured and hardened cement-asbestos sheet product composed of integrated multiple layers of a waterlaid web of cement and asbestos fibers, a substantial proportion of said fibers being soft chrysotile asbestos fibers, said cement-asbestos web composition including from about 1% to about 5%, by dry weight, of harsh mineral glass fibers, said mineral glass fibers being in the range of from about 5 microns to about 25 microns in diameter.

8. A product according to claim 7, wherein the diameter of said mineral glass fibers ranges between about 7 microns and about 20 microns.

9. A product according to claim 7, wherein said mineral glass fibers are predominantly of calcium aluminum silicate composition.

10. A cured and hardened cement-bonded asbestos sheet product composed of a waterlaid web of asbestos fibers and Portland cement, said fibers being predominantly of chrysotile asbestos, and the proportion of said fibers, by weight, being substantially greater in amount than said cement, said cement-bonded asbestos web composition including from about 1% to about 5%, by dry weight, of harsh mineral glass fibers, said mineral glass fibers being in the range of from about 5 microns to about 25 microns in diameter.

11. A product according to claim 10, wherein the diameter of said mineral glass fibers is between about 7 microns and about 20 microns.

12. A product composed of integrated multiple layers of the sheet product of claim 10.

13. A product according to claim 10, wherein said mineral glass fibers are predominantly of calcium aluminum silicate composition.

14. The method of improving the water filtration rate from a waterlaid web formed from a slurry of cement and asbestos fibers in water on a foraminous carrier, and of enhancing the breaking strength of a dry sheet so formed, wherein a substantial proportion of said asbestos fibers is of soft chrysotile asbestos fibers, which includes the steps of adding to said slurry and dispersing therein, just prior to supplying said slurry to said foraminous carrier, from about 1% to about 5%, by dry weight, of the total solids in said slurry, of harsh mineral glass fibers having a diameter from about 5 microns to about 25 microns, whereby the destructive effects of the mechanical stresses and the abrasive action of the dispersing operation on said mineral glass fibers are minimized.

15. The method of claim 14, wherein the diameter of said mineral glass fibers is between about 7 microns and about 20 microns.

16. The method of claim 14, wherein said mineral glass fibers are predominantly of calcium aluminum silicate composition.

17. The method of claim 14, wherein said mineral glass fibers are added in an amount from about 1% to about 3%, by dry weight, of the total solids in said slurry.

References Cited

UNITED STATES PATENTS 3,014,835  12/1961  Feigley et al. _____ 162—154

FOREIGN PATENTS 509,035  1939  Great Britain.

DONALL H. SYLVESTER, *Primary Examiner.*

A. C. HODGSON, *Assistant Examiner.*